UNITED STATES PATENT OFFICE.

MAX ENGELMANN, OF ELBERFELD, GERMANY, ASSIGNOR TO FARBENFABRIKEN VORM. FRIEDR. BAYER & CO., OF ELBERFELD, GERMANY, A CORPORATION OF GERMANY.

ORGANIC MERCURY COMPOUND.

978,145.     Specification of Letters Patent.     Patented Dec. 13, 1910.

No Drawing.    Application filed December 21, 1909.    Serial No. 534,325.    (Specimens.)

*To all whom it may concern:*

Be it known that I, MAX ENGELMANN, doctor of philosophy, chemist, citizen of the German Empire, residing at Elberfeld, Germany, have invented new and useful Improvements in Organic Mercury Compounds, of which the following is a specification.

My invention relates to the preparation of hitherto unknown easily soluble compounds derived from the ortho-oxymercuric compound of salicylic acid anhydrid (hydrargyrum salicylicum). In order to prepare these products the known ortho-oxymercuric salicylic acid anhydrid (hydrargyrum salicylicum of the German *Pharmacopœia*) is treated with alkali and amino fatty acids (*e. g.* derived from the fatty acids by the exchange of a hydrogen atom of the hydrocarbon radical for an amino group) or with the alkali salts of amino acids. The same products result by at first treating the ortho-oxymercuric salicylic anhydrid with alkalies and then treating the products thus obtained with amino fatty acids. The new compounds thus obtained are whitish odorless compounds which are very easily soluble in water and insoluble in ether. They have proved to be valuable antisyphilitics characterized by a mild action and as they are non-irritants and not corrosive they are highly valuable for internal application especially for subcutaneous injection. They contain the mercury so firmly combined that on adding a diluted solution of caustic alkali or a cold solution of ammonium sulfid no precipitate is obtained. A solution of from 0.1—0.2 grams may be used for one subcutaneous injection.

The new compounds are characterized by the following general formula:

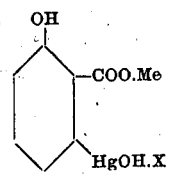

in which Me means alkali metal (potassium sodium lithium) and X an amino fatty acid and they are formed by direct addition of the amino fatty acid molecule to the molecule of the ortho-oxymercuric compound of salicylic acid anhydrid.

In carrying out my invention I can proceed as follows, the parts being by weight:— 170 parts of the ortho-oxymercuric compound of salicylic acid anhydrid (hydrargyrum salicylicum) are added to a solution of 60 parts of beta-amino-alpha-oxyisobutyric acid in 250 parts of a water solution containing 8 per cent. NaOH. The solution is filtered and then alcohol is added to the filtrate. The new compound which is the sodium salt of ortho-oxymercuric salicylic acid-beta-amino-alpha-oxyisobutyric acid separates. The whitish product is easily soluble in water, insoluble in alcohol, ether and benzene. It contains about 40 per cent. of mercury and has no definite melting point but decomposes at about 200° C.

Other amino fatty acids, such as aminoacetic acid, serin, alanin, leucin, sarcosin, tyrosin, etc., or other alkalies may be used.

I claim:—

1. The herein described new mercury compounds possessing probably the following general formula:

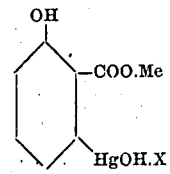

in which Me means alkali metal and X an amino fatty acid, obtainable by reacting with alkali and an amino fatty acid upon ortho-oxymercuric compound of salicylic acid anhydrid, which new mercury compounds are whitish powders easily soluble in water and insoluble in ether, and containing the mercury so firmly combined that the aqueous solutions do not give any precipitate on the addition of dilute caustic soda lye or a cold solution of ammonium sulfid; and being valuable therapeutics, substantially as described.

2. The herein described new specific mercury compound obtainable by reacting with alkali and beta-amino-alpha-oxyisobutyric acid upon ortho-oxymercuric compound of salicylic acid anhydrid which is a whitish powder, easily soluble in water, insoluble in alcohol, ether and benzene having no definite melting point, but decomposing at about 200° C, and containing the mercury so firmly combined that the aqueous solution does not give any precipitate on the addition of dilute caustic soda lye or a cold solution of ammonium sulfid; and being a
5 valuable therapeutic compound, substantially as described.

In testimony whereof I have hereunto set my hand in the presence of two subscribing witnesses.

MAX ENGELMANN.

Witnesses:
 OTTO KÖNIG,
 CHAS. J. WRIGHT.